May 19, 1964     J. D. RICHARD     3,133,445
ULTRASONIC PARTICLE SIZE MEASUREMENT APPARATUS
Filed Jan. 6, 1961     2 Sheets-Sheet 1
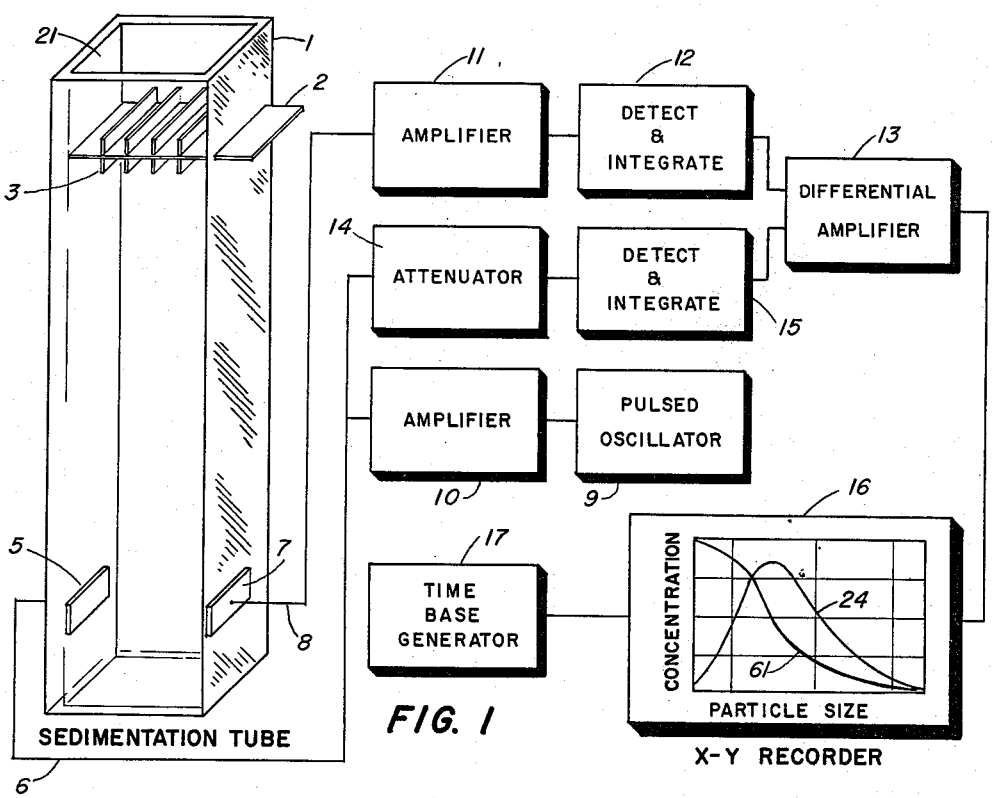
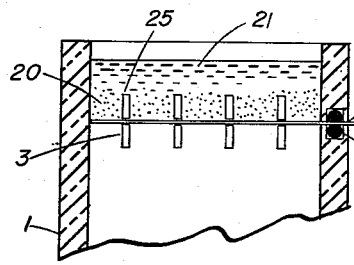
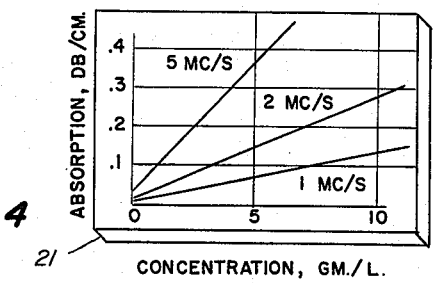
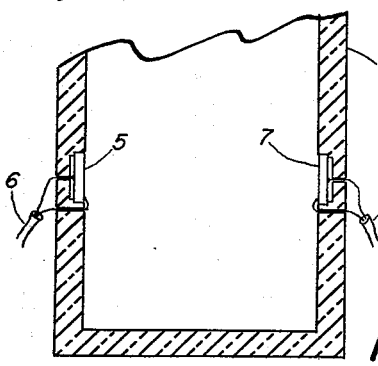
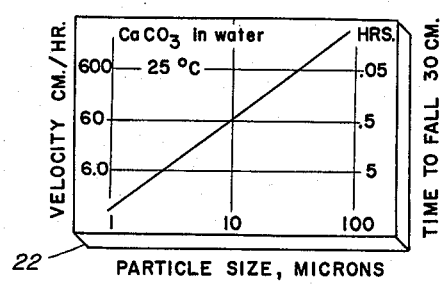
INVENTOR
Joseph D. Richard May 19, 1964 J. D. RICHARD 3,133,445
ULTRASONIC PARTICLE SIZE MEASUREMENT APPARATUS
Filed Jan. 6, 1961 2 Sheets-Sheet 2
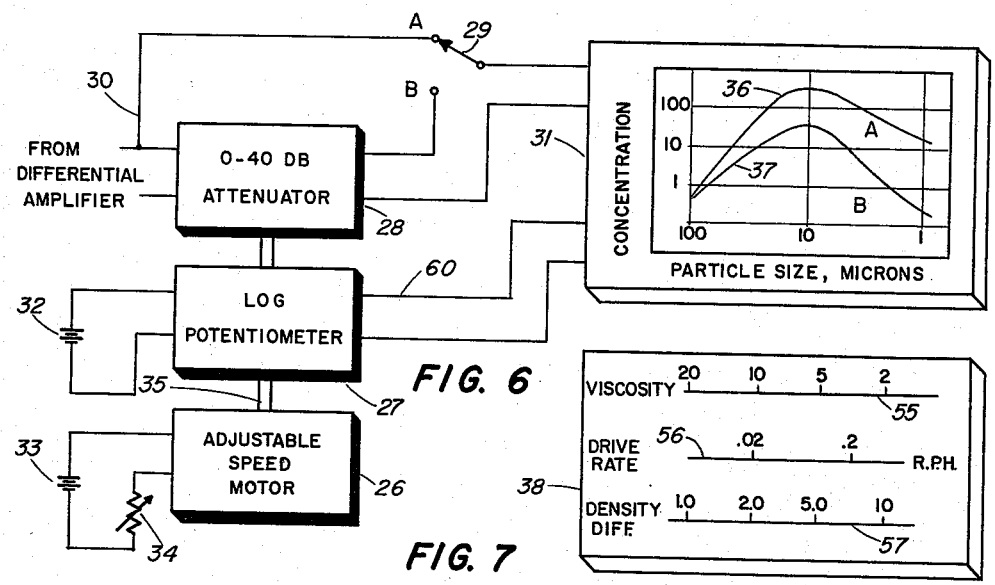
FIG. 6
FIG. 7
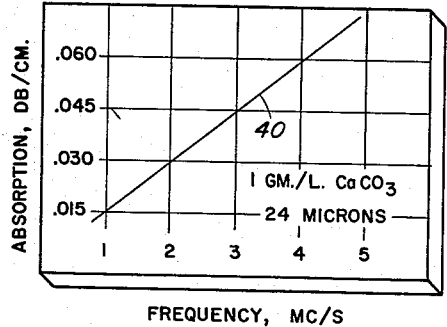
FIG. 8
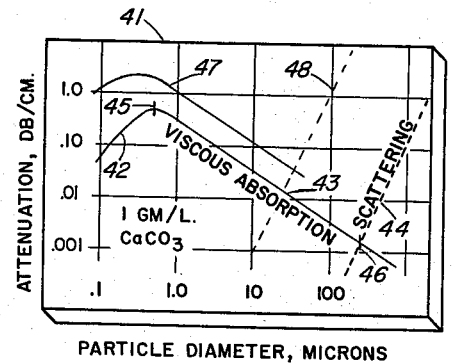
FIG. 9
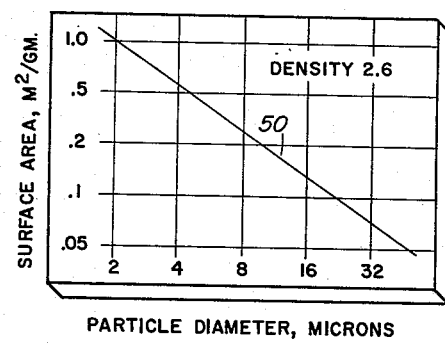
FIG. 10
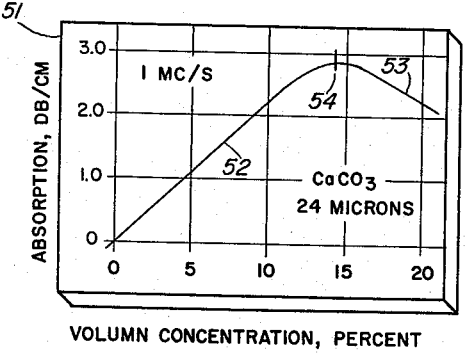
FIG. 11
INVENTOR
Joseph D. Richard

United States Patent Office 3,133,445
Patented May 19, 1964

3,133,445
ULTRASONIC PARTICLE SIZE MEASUREMENT APPARATUS
Joseph D. Richard, 531 S. Barrancas Ave., Miami, Fla.
Filed Jan. 6, 1961, Ser. No. 81,201
2 Claims. (Cl. 73—432)

The present invention relates to the field of small particle measurement. More specifically it relates to an apparatus for the determination of the size distribution of an aggregate of small particles in the subsieve range.

In the past a number of instruments and methods have been used for measuring the dimensions of small particles. These have included the basic techniques of microscopic count, sedimentation, permeability, photo-extinction, adsorption, and heat of wetting. Of the above, only the first two have proven to be consistently reliable. Because the microscopic count is tedious and time consuming the sedimentation method is most often used. Sedimentation methods are based upon the well known Stokes' law which relates the terminal velocity of the suspended particle settling under the force of gravity to the density and diameter of the particle and the viscosity and density of the suspending fluid. These methods are capable of considerable accuracy even though the simplifying assumptions, such as particle sphericity and smoothness, are seldom realized in practice. Various methods have been devised for following the particle sedimentation as it progresses. Usually the decrease in concentration of particles at or above a particular level in the suspension is repeatedly measured during the sedimentation process.

The variation in particle concentration at various positions in the sedimentation column can be determined in a number of ways. The pipette, hydrometer, sediment balance, and light adsorption methods have most often been used. The pipette method requires the repeated withdrawal, evaporation, and weighing of samples from the sedimentation tube. In the hydrometer method the density, and thus the concentration of the suspension at the level of the center of gravity of the displaced suspension, is determined with a hydrometer. The sediment balance method consists of weighing the particles which accumulate with time on a pan at the bottom of the settling column by means of a delicate balance fixed inside the sedimentation tube. The light absorption method is based upon the application of the Lambert-Beer law to a suspension of solid particles in a fluid medium. The shadow projected area of the particles is assumed to be proportional to the volume concentration of the particles. All of the above methods have certain disadvantages and limitations. The pipette method is accurate but extremely tedious and time consuming. The hydrometer method lacks accuracy and resolution due to the large volume of the hydrometer. The sediment balance method requires expensive and fragile apparatus. The light absorption method has certain advantages in that nothing need be inserted in the sediment tube and the measurements may be automatic and continuous. The obvious advantages of the light absorption methods are offset by the complicating factors of reflection, polarization, and scattering. The relative magnitude and interdependence of these effects vary with the wavelength of light and the relative particle size. A simple measurement of light transmitted by a sample does not uniquely define the concentration of a suspension of small particles.

Sedimentation tube sampling techniques used in the past have been fraught with numerous disadvantages and difficulties. The present invention provides a method and apparatus for determining the particle size distribution of small particles in a sedimentation column which is devoid of the above mentioned problems. More specifically the present invention provides a method and means for measuring the particle concentration in a sedimentation tube by means of the absorption of ultrasonic energy by the suspended particles. The wavelengths and particle sizes involved are such that errors due to scattering are negligible. The ultrasonic absorption is a direct measure of the particle surface area. The particle size range between the transducers is known for all increments of time after the initiation of sedimentation from Stokes' equation. Since the particle surface area and size range can be continuously known or measured, a graphic record of the particle concentration throughout the size range of interest can be automatically made as the sedimentation progresses.

An object of my invention is to provide an apparatus for measuring the size distribution of small particles according to the sedimentation principle, in which a continuous and automatic record is made of the particle concentration as the sedimentation progresses.

A further object of my invention is to provide a means for sampling the particle concentration in a sedimentation tube in which the variable quantity measured bears a direct relationship with the particle concentration without appreciable sources of error.

Another object of my invention is to provide a system for measuring the particle concentration in a sedimentation tube which does not require the repeated withdrawal of samples for evaporation and weighing.

It is a further object of the present invention to provide a measuring system for particle concentrations in a sedimentation tube which requires no fragile mechanical parts such as a balance pan, or other calibrated weighing or density measuring devices.

Other objects and advantages will become more apparent from a study of the following specifications and drawings in which:

FIGURE 1 is a perspective view of the sedimentation tube of the present invention including a block diagram of the electronic drive circuits and the electronic sensing and recording circuits.

FIGURE 2 is a cross-sectional view of the top part of the sedimentation tube including baffle and plate means for introducing particles into the sedimentation tube.

FIGURE 3 is a cross-sectional view of the bottom part of the sedimentation tube including ultrasonic transmitting and receiving transducers.

FIGURE 4 is a graph relating ultrasonic absorption to particle concentration for a particular material.

FIGURE 5 is a dual graph of particle velocity versus particle size and particle time of descent versus particle size.

FIGURE 6 is a block diagram of log time base recorder useful with the present invention.

FIGURE 7 is a nomograph relating suspending fluid viscosity, recorder drive rate and density difference between the suspended particles and the suspending medium.

FIGURE 8 is a graph of ultrasonic absorption versus ultrasonic frequency for a particular amount of a particular material having a specified particle size.

FIGURE 9 is a graph of ultrasonic attenuation versus particle diameter for a particular weight concentration of the material.

FIGURE 10 is a graph of particle surface area versus particle diameter holding particle density constant.

FIGURE 11 is a graph of ultrasonic wave absorption versus particle concentration while holding particle size constant.

Size data of particulate materials are usually represented by a graph plotted to show the relation between frequency of occurrence and some measured dimension. When sedimentation techniques are used, the measured dimension is the Stokes' diameter of an equivalent smooth sphere of the same density and terminal velocity as the measured particle. When a spherical particle is left undisturbed in a medium in a gravitational field it will soon reach a constant velocity $$v = \frac{2(\rho - \rho_0)g}{9\eta} \cdot \gamma^2$$

where $\rho$ is the density of the particle, $\rho_0$ the density of the medium, $g$ the acceleration due to gravity, $\gamma$ the radius of the particle, $v$ is the velocity of the particle, and $\eta$ the viscosity of the medium. For a given suspension $$v = \text{constant} \cdot \gamma^2$$

The radius of a particle of known density can be determined by its sedimentation velocity through a medium of known density and viscosity. The sedimentation methods involve essentially the measure of the concentration of particles at or above a particular level in a suspension as sedimentation proceeds. When the conditions are such that the decrease in concentration with time truly represents the free fall of the particles from the suspension, that is, where there is no interference between particles and the Reynolds number is below 1, Stokes' law can be applied ot give the diameter of the largest particle which will just have arrived at the measurement level in the sedimentation vessel in the time interval before test. The size distribution is calculated from the readings taken at successive time intervals.

Referring again to FIGURE 1, a vertically elongated sedimentation vessel 1 is shown with ultrasonic transmitting and receiving apparatus arranged for continuously measuring the acoustic absorption at a particular level in the sedimentation column. Repetitious high frequency signals from the pulsed oscillator 9 are amplified by the amplifier 10 and transmitted into the sedimentation vessel 1 by means of the ultrasonic transducer 5. The amplified pulsed signals from the amplifier 10 are also fed into the attenuator 14, processed by the detection and integration circuits 15 and the resulting D.C. voltage is fed into the first input of the differential amplifier 13. Direct and multiply reflected ultrasonic pulses are picked up by the receiving transducer 7, amplified by the amplifier 11, processed by the detection and integration circuitry 12 and the resulting D.C. voltage is fed into the second input of the differential amplifier 13. The differential output of the amplifier 13 is fed to the vertical deflection input of the X—Y recorder 16. The electrical output of the time base generator 17 is fed to the horizontal deflection input of the X—Y recorder 16. The horizontal deflection of the recorder 16 is then a function of time and the vertical deflection is a function of the variations in ultrasonic absorption between the transmitting transducer 5 and the receiving transducer 7. In a particular suspension, the time required for a particle to fall a fixed distance can be related to the Stokes' diameter of the particle. Thus the time base generator 17 and the horizontal deflection of the recorder 16 can be calibrated in terms of the Stokes' diameter of the particles which have fallen the fixed distance between the sample chamber 21 and the position between the transducers 5 and 7.

FIGURE 2 shows the top portion of the sedimentation vessel 1 in more detail. One method of introducing the sediment sample is shown. A thin plate 2 is inserted into the vessel through the slot 23. Leakage is prevented by the seal 19. The thin plate 2 fits between the top and bottom portions of a series of baffles. The top portion 25 and the bottom portion 3 comprise one of the four baffles shown in FIGURE 2. The thin plate 2 when inserted in the slot 23 effectively closes off the sample chamber 21 from the remainder of the sedimentation vessel 1. An aggregate of small particles 20 is shown above the thin plate 2. When the plate 2 is withdrawn the particles 20 are free to fall into the settling chamber of the sedimentation vessel 1. The top portion of the baffles prevent the particle 20 from being all pulled to one side of the vessel as the plate 2 is withdrawn. In practice the particles 20 should be stirred so that they are dispersed throughout the entire volume of the sample chamber 21 before the plate 2 is withdrawn so that there will be a minimum of interference between particles during the initial stages of sedimentation.

In FIGURE 3 the transmitting transducer 5 and the receiving transducer 7 are shown mounted in the lower portion of the sedimentation vessel 1. In this preferred arrangement, flat reflecting surfaces are maintained on both sides so that multiple reflections can be received by the transducer 7. A longer transmission path and greater resolution in the absorption measurement is achieved by the use of the integrated value of the multiply reflected ultrasonic pulses.

The absorption for three ultrasonic frequencies as a function of particle concentration is shown in FIGURE 4. The particles were calcium carbonate with diameters of about 24 microns. The absorption increases linearly with concentration. For a given concentration the absorption increases directly with the frequency.

FIGURE 5 shows the settling velocity and the time required to fall a fixed distance of 30 centimeters for calcium carbonate particles of various diameters. The suspending medium is water at 25° C. temperature.

FIGURE 6 shows an adjustable speed motor 26 which drives the logarithmic potentiometer 27 and the attenuator 28 by means of the connecting shaft 35. The speed of the motor 26 may be controlled by means of the variable resistance 34. When the shaft 35 is driven at some constant speed from the starting position, the output 60 of the logarithmic potentiometer 27 increases from zero to the full value of the battery 32 at a rate which decreases logarithmically with time. For the extreme range of particle sizes indicated on the horizontal scale of the X—Y recorder 31, it can be seen from FIGURE 5 that the horizontal deflection of the recorder would require 0.5 hour from the starting position at 100 microns to the 10 micron position and an additional 49.5 hours to reach the 1 micron position. The output 60 of the logarithmic potentiometer 27 drives the horizontal deflection input of the X—Y recorder 31 accordingly. The shaft 35 also drives the attenuator 28 so that the output from the differential amplifier is attenuated an amount varying between zero and 40 db for the full shaft rotation. Thus when the horizontal deflection of the X—Y recorder reaches 10 microns the attenuator 28 will have a value of 20 db and when the horizontal deflection reaches 1 micron the attenuator 28 will have reached its limit of 40 db. The switch 29 allows either the attenuator 28 output or the direct differential amplifier output 30 is to be fed to the vertical deflection of the X—Y recorder 31. The curve 36 shows the direct differential amplifier output and the vertical deflection is proportional to the surface area of the suspended particles. The curve 37 shows the attenuator 28 output and the vertical deflection is proportional to weight per volume of suspended particles. The relative absorption between suspensions of different particle size but with equal weight per volume concentrations can be seen by the curve 43 in FIGURE 9. For equal weights per volume, the absorption in a suspension of 1 micron size particles would be 100 times the absorption in a suspension of 100 micron size particles. This is due to the much larger surface area per weight of the smaller particles. The attenuator 28 allows a continuous correction to be applied as the particle size decreases. Actually the surface area of the particles is more often the desirable quantity to be measured. Thus for most particle analyses the attenuator 28 would be by-passed by the selector switch 29 so that the X—Y recorder 31 would plot a curve 36 the vertical coordinate of which is proportional to particle surface area and the horizontal coordinate of which is an indication of the Stokes' diameter of the particles.

In FIGURE 7 a nomograph 38 shows how the drive rate of the adjustable speed motor 26 can be varied to accommodate variations in viscosity of the suspending medium and also variations in density differences between the particle and the suspending medium. It is assumed that the horizontal scale of the recorder 31 is fixed to cover the 1 to 100 micron range. It is also assumed that the sedimentation distance was fixed at 30 cm. The scale 55 gives the viscosity in millipoises. If the same liquid is always used as the suspending medium, the scale 55 can be converted to read in temperature directly. The apparatus of FIGURES 1 and 6 may thus be used without modification for a wide range of particle density and liquid density and viscosity by referring to a diagram such as the one in FIGURE 7 and setting the drive rate of the adjustable speed motor 26 accordingly. The drive rate shown on the scale 56 is in revolutions per hour. The scale 57 is for density difference between particles and suspending liquid. For a given suspension, the nomograph may be used for temperature corrections of viscosity and density and compensation made by an appropriate adjustment in the drive rate.

FIGURE 8 shows the relationship between ultrasonic absorption and frequency for the indicated concentration of calcium carbonate. The plot 40 shows a linear relationship.

The relative effects of several phenomena which can contribute to the ultrasonic attenuation are shown in FIGURE 9. One gram per liter suspensions of calcium carbonate of various sizes are plotted against the total ultrasonic attenuation. For the 1 mc./s. data the attenuation is due solely to absorption between the particle range 1 to 100 microns. Beyond the lower size limit 45, the decreasing section of the curve 42 is attributable to the free movement of the small particles with the suspending fluid so that the viscous loss is greatly reduced. Above the larger size limit 46, attenuation of the ultrasonic signal due to Rayleigh scattering predominates over the absorption. The absorption curve 47 and the scattering curve 48 are for the ultrasonic frequency of 5 mc./s. It can be seen that an ultrasonic frequency of 1 or 2 mc./s. is about ideal for particles ranging from 1 to 100 microns diameter. For these frequencies and particle sizes the measured ultrasonic signal attenuation is entirely attributable to viscous absorption and is directly proportional to particle surface area.

In FIGURE 10 the line 50 shows the relationship between particle surface area per gram sample and particle diameter for particles of the indicated density.

FIGURE 11 shows the relationship between absorption and particle concentration for a suspension of calcium carbonate. The strait section 52 of the plotted data shows a linear relationship between absorption and particle concentration up to a limiting concentration 54 at which point particle interaction effects become important. For higher particle concentrations there is a decreasing absorption as shown by the section 53.

As can be seen from the foregoing specifications and drawings, I have provided a method and apparatus for determining the size distribution of an aggregate of small particles. An acoustic method is described which measures directly the surface area of the particles of a known size distribution during the process of sedimentation. The Stokes' diameter and the particle concentration may be continually recorded as the sedimentation progresses. Although the ultrasonic absorption yields a direct measure of the particle surface area, the weight per volume and the number of particles per volume can be easily determined for each size range. There are important advantages in the method described herein for the direct measurement of particle surface area. Measurements of the surface area of an aggregate of irregular particles is of great importance in chemical engineering. Catalysis, solubility, and adsorption are among the phenomena which are directly dependent on surface area.

A flexible method has been shown in FIGURES 1, 6, and 7 which allows a continuous record of particle size and concentration to be made for various ranges of particle density, liquid density, and liquid viscosity. It can be readily seen from the nomograph in FIGURE 7 that liquids of lower viscosity may be selected which will allow the sedimentation to proceed at a faster rate. For example ether may be used as the suspending liquid and a much shorter analysis time would be required for a given particle aggregate. The proper motor drive rate may be determined by reference to the nomograph. Since the viscosity of liquids decrease about 2% for each degree rise in temperature, the variations in temperature of the suspending liquid should be compensated for by reference to the viscosity scale of the nomograph.

The particular embodiment of my invention shown in the drawings is merely illustrative of one particular mode of operation. FIGURE 1 shows a sedimentation tube in which a dispersed particle sample may be introduced at the top. For some applications the sedimentation would be affected by particle interaction during the initial stages of stages of settling and Stokes' law would not be strictly applicable. An alternate method would be to disperse the particles uniformly throughout the sedimentation tube before allowing sedimentation to proceed. The ultrasonic absorption will then start at a maximum value and decrease at a rate which is a function of the particle size distribution and the particle concentration may be recorded as percentage of particles less than the indicated diameter. The curve 61 in FIGURE 1 shows the concentration Stokes' diameter (time) characteristics of a suspension as the sedimentation proceeds using this alternate method.

When using any sedimentation method it is necessary that the particles be completely dispersed by a suitable surface agent, such as a dilute solution of sodium silicate, before sedimentation begins.

It should be understood that the foregoing description of this invention concerns only the preferred embodiment thereof and that accordingly changes and modifications may be made therein by those skilled in the art without departing from the spirit and scope of the invention as defined in the following claims.

Having thus fully described my invention, I claim:

1. Apparatus for particle size analysis comprising: a sedimentation vessel wherein an aggregate of small particles suspended in a liquid may be spatially distributed according to well known sedimentation phenomenon; a pulsed oscillator having electrical signals of an ultrasonic frequency; a transducer for transmitting ultrasonic signals through a section of the sedimentation vessel in response to the said pulsed oscillator signals; means for deriving a first D.C. voltage, the value of which is proportional to the average amplitude of the said pulsed oscillator signals; means for receiving a portion of the said transmitted ultrasonic signals after transmission through a section of the sedimentation vessel; means for amplifying the said received signals; means for deriving a second D.C. voltage, the value of which is proportional to the average amplitude of the said amplified received signals; means for deriving a thitrd D.C. voltage the value of which is proportional to the difference between said first and second D.C. voltages; and means for recording said differential voltage as a function of time as the sedimentation progresses.

2. Apparatus for particle size analysis comprising: a sedimentation vessel wherein an aggregate of small particles suspended in a liquid may be spatially distributed according to well known sedimentation phenomenon; a source of electrical pulses of an ultrasonic frequency; a first transducer for transmitting ultrasonic signals into the said sedimentation vessel in response to said electrical pulses; a second transducer for receiving said ultrasonic signals after transmisison through a section of the said sedimentation vessel, variation in the amplitude with time of the received signals being a measure of the variations in ultrasonic absorption of the medium between the two transducers; a two coordinate graphic recorder having first and second inputs, the first input being responsive to the variations in amplitude of the said received signals; and an electrical waveform generator for driving the second input of the said recorder, the said waveform generator having an output voltage which increases with time with a rate of change which decreases logarithmically with time.

References Cited in the file of this patent

UNITED STATES PATENTS

| | | |
|---|---|---|
| 2,104,525 | Proskouriakoff | Jan. 4, 1938 |
| 2,755,662 | Swengel | July 24, 1956 |
| 2,960,870 | Nelsen et al. | Nov. 22, 1960 |
| 2,966,056 | Heller | Dec. 27, 1960 |
| 3,009,388 | Polanyi | Nov. 21, 1961 |

OTHER REFERENCES

Hartmann et al.: "Absorption of Supersonic Waves in Water and Aqueous Suspensions," Physical Review, volume 57, February 1, 1940, pages 221 to 225.

Richardson, R. C.: "Ultrasonic Physics," pages 252 to 260 (book published by Elsevier Publishing Company in 1952).

Publication by L. Cohen, appearing in Instrument Practice, vol. 13, No. 10, October 1959, pages 1036–1041.